United States Patent [19]
Wang

[11] Patent Number: 5,878,638
[45] Date of Patent: Mar. 9, 1999

[54] POSITIONING DEVICE FOR A DRIVING SHAFT OF A LATHE CHUCK

[75] Inventor: Chin Feng Wang, Taichung Hsien, Taiwan

[73] Assignee: Colovos Co., Ltd., Taichung Hsien, Taiwan

[21] Appl. No.: 880,217

[22] Filed: Jun. 23, 1997

[51] Int. Cl.⁶ .............................. B23B 19/00; B23Q 16/06
[52] U.S. Cl. ........................... 82/142; 74/813 R; 82/117; 142/1; 142/55; 409/222
[58] Field of Search ............................. 142/1, 55; 82/117, 82/142, 156; 409/221–223; 74/813 R; 269/69, 70

[56] References Cited

U.S. PATENT DOCUMENTS 2,341,099  2/1944  Hellman ................................ 74/813 R
3,090,633  5/1963  Farnsworth ............................. 409/222

*Primary Examiner*—Steven C. Bishop
*Attorney, Agent, or Firm*—Charles E. Baxley, Esq.

[57] ABSTRACT

A positioning device for a driving shaft of a lathe chuck includes a casing, a motor received in the casing with a driving shaft of the motor extending through a first end and a second end of the casing, and a disk disposed to the first end of the casing and threadedly mounted to the driving shaft. The disk has at least one hole defined therethrough and the first end of the casing has a plurality of holes defined therethrough so that a pin is removably extending through the hole in the disk and received in one of the holes in the first end of the casing to position the driving shaft to which the lathe chuck is connected.

3 Claims, 2 Drawing Sheets

POSITIONING DEVICE FOR A DRIVING SHAFT OF A LATHE CHUCK

BACKGROUND OF THE INVENTION

1. Field of the Invention

The present invention relates to a positioning device and, more particularly, to a positioning device for a driving shaft to which a lathe chuck is connected.

2. Brief Description of the Prior Art

A wood-turning lathe can be used to cut a periphery of a tubular work piece, for example to cut a slot and a notch diametrically opposite in the periphery of the work piece. However, the work piece is fixed connected to a chuck which is driven by a driving shaft of a motor, in order to precisely cut such slot and notch as mentioned above, an operator has to fix the chuck by using an angle setting device which will be fixedly disposed to the chuck and the work piece is attached to the angle setting device. This involves many additional processes and additional cost.

The present invention intends to provide a positioning device for positioning a driving shaft to which a lathe chuck is disposed so as to mitigate and/or obviate the above-mentioned problems.

SUMMARY OF THE INVENTION

The present invention provides a positioning device for a driving shaft of a lathe chuck, wherein the positioning device comprises a casing which has a first end with a central hole defined therethrough, at least one first hole and a plurality of second holes respectively defined around the central hole, and a second end for a motor received in the casing.

The motor has a first end with at least one first threaded hole being defined therein for at least one bolt extending through the first hole and being threadedly engaged with the first threaded hole to position the motor, and a second end with a flange extending radially therefrom so as to be fixedly connected to the second end of the casing. A driving shaft is rotatably extending through the motor and has a first end thereof extending from the first end of the motor and a second end of the driving shaft extending from the second end of the motor for a lathe chuck to be connected thereto. The first end of the driving shaft has a threaded periphery defined therein.

A disk has a second threaded hole and at least one third hole respectively defined therethrough, the threaded periphery of the driving shaft being threadedly engaged with the second threaded hole. A pin is removably extending through the third hole and is received in the second hole of the casing.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
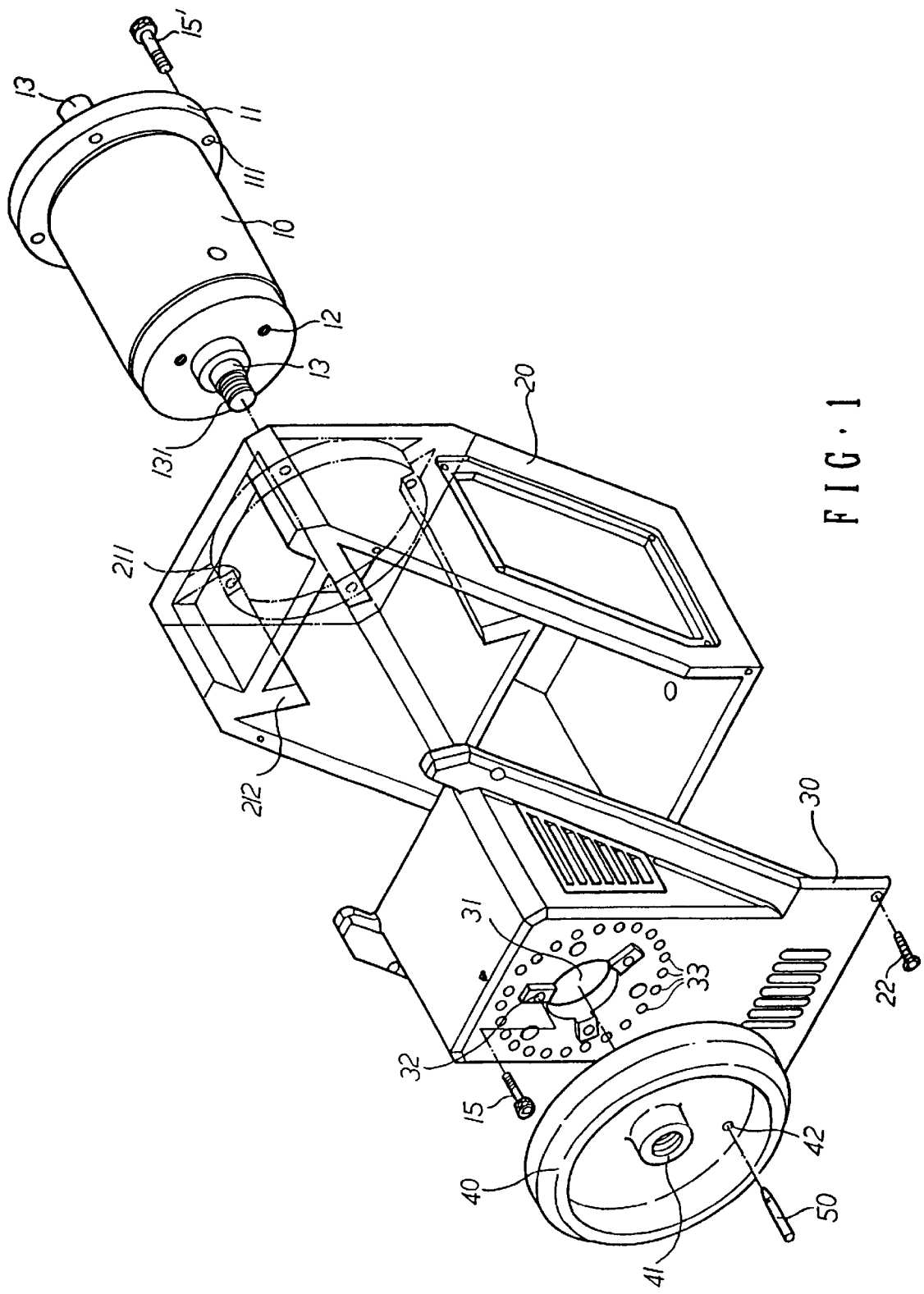
FIG. 1 is an exploded view of a positioning device in accordance with the present invention.

Referring to FIG. 1, a positioning device in accordance with the present invention generally includes a casing which is composed of a first part 20 and a second part 30 which is connected to the first part 20 by bolts 22 (only one is shown) so as to have a first end and a second end. The first end of the casing has a central hole 31 defined therethrough, at least one first hole 32 and a plurality of second holes 33 respectively defined around the central hole 31 in the first end of the casing.

A motor 10 is received in the casing from the second end of the casing wherein the second end of the casing has at least three ribs 212 extending inwardly from an inner periphery thereof so as to receive the motor 10 therebetween. Each of the ribs 212 has a third threaded hole 211 defined in one of two ends thereof facing to the second end of the casing. The motor 10 has a first end with at least one first threaded hole 12 being defined therein for at least one bolt 15 extending through the first hole 32 of the casing and being threadedly engaged with the first threaded hole 12 to position the motor 10. A flange 11 extends radially from a second end of the motor 10 so that the flange 11 is fixedly connected to the second end of the casing by extending bolts 15' (only one is shown) through holes 111 defined in the flange 11 and being threadedly engaged with the third threaded holes 211 of the ribs 212.

A driving shaft 13 is rotatably extending through the motor 10 and has a first end thereof extending from the first end of the motor 10 and a second end of the driving shaft 13 extending from the second end of the motor 10 for a lathe chuck 70 to be connected thereto. The first end of the driving shaft 13 has a threaded periphery 131 defined therein.

A disk 40 has a second threaded hole 41 and at least one third hole 42 respectively defined therethrough, the threaded periphery 131 of the driving shaft 13 being threadedly engaged with the second threaded hole 41 so that the disk 40 is firmly connected to the driving shaft 13. A pin 50 removably extends through the third hole 42 and is received in one of the second holes 33 of the casing so that when the motor 10 is unplugged, the driving shaft 13 is maintained still and not rotated.

Figure 2:
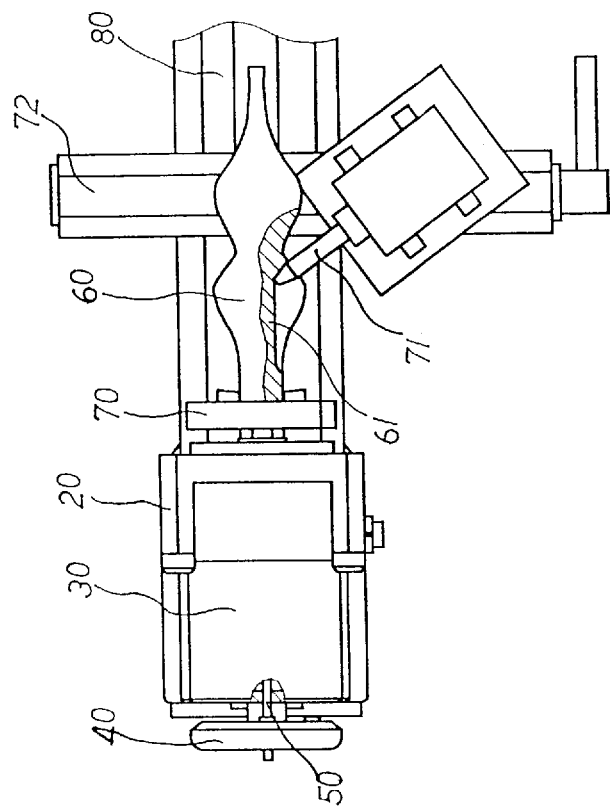
FIG. 2 is a top view to show the chuck is positioned by the positioning device in accordance with the present invention and a workpiece attached to the chuck is machined by a knife of the lathe to have a slot defined therein.
Figure 3:
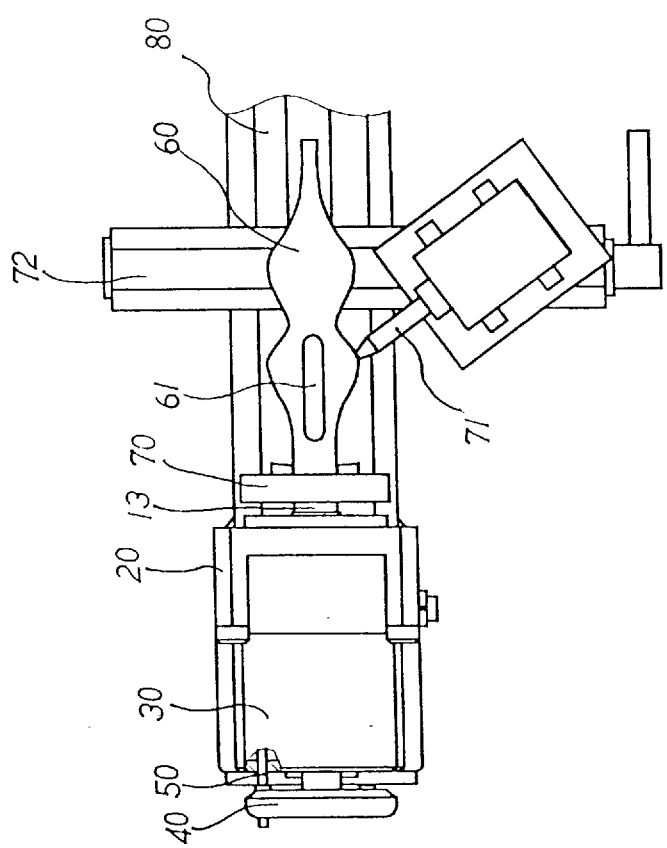
FIG. 3 is a view similar to FIG. 2, wherein the workpiece is rotated 90 degrees and the chuck is positioned by the positioning device.

Referring now to FIGS. 2 and 3, a workpiece 60 is fixedly connected to the chuck 70 and the motor 10 in unplugged, the pin 50 is inserted into the third hole 42 and one of the second holes 33 so that the workpiece is positioned and will not be rotated. A knife 71 is fixedly disposed to a cross slide 72 which is slidably disposed to the lathe bed 80 and the knife 71 machines a slot 61 defined in an outer periphery of the workpiece 60 as shown in FIG. 2. In order to machine another notch (not shown), for example, in the outer periphery of the workpiece at a position having 90 degrees from the slot 61, the pin 50 is first withdrawn from the disk 40 and the chuck 70 is rotated 90 degrees, and the pin 50 is inserted into the third hole 42 and another second holes 33 again to position the workpiece 60.

Therefore, the workpiece 60 and the chuck 70 can be firmly positioned without using conventional angle setting devices and the positioning device of the present invention is easily to be used.

Although the invention has been explained in relation to its preferred embodiment, it is to be understood that many other possible modifications and variations can be made without departing from the spirit and scope of the invention as hereinafter claimed.

What is claimed is:

1. A positioning device comprising:

a casing having a first end and a second end, said first end of said casing having a central hole defined therethrough and at least one first hole and a plurality of second holes respectively defined around said central hole in said first end of said casing, a motor being received in said casing, said motor having a first end with at least one first threaded hole being defined therein for at least one bolt extending through said first hole of said casing and being threadedly engaged with said first threaded hole to position said motor, and a second end with a flange extending radially therefrom so as to be fixedly connected to said second end of said casing, a driving shaft rotatably extending through said motor and having a first end thereof extending from said first end of said motor and a second end of said driving shaft extending from said second end of said motor for a lathe chuck to be connected thereto, said first end of said driving shaft having a threaded periphery defined therein, and a disk having a second threaded hole and at least one third hole respectively defined therethrough, said threaded periphery of said driving shaft being threadedly engaged with said second threaded hole, a pin removably extending through said third hole and being received in one of said second holes of said casing.

2. The positioning device as claimed in claim 1 wherein said casing has at least three ribs extending inwardly from an inner periphery thereof so as to receive said motor therebetween.

3. The positioning device as claimed in claim 2 wherein each of said ribs has a third threaded hole defined in one of two ends thereof so that bolts extend through holes defined in said flange and are threadedly engaged with said third threaded holes of said ribs.

* * * * *